Oct. 27, 1959

H. C. REID 2,910,174

EXPENDABLE THERMOMETER SHEATH

Filed Dec. 26, 1957

INVENTOR.
HELEN C. REID
BY
Morgan, Finnegan, Durham & Pine
ATTORNEYS.

United States Patent Office 2,910,174
Patented Oct. 27, 1959

2,910,174

EXPENDABLE THERMOMETER SHEATH

Helen Campbell Reid, Summit, N.J.

Application December 26, 1957, Serial No. 705,235

1 Claim. (Cl. 206—16.5)

This invention relates to an expendable prophylactic cover for a clinical thermometer and to such a cover in combination with a thermometer.

It has been recognized for a great many years that the clinical thermometer when used carelessly can act as a conduit of infection to those persons among whom it is communally shared. Many efforts have been put forth to prevent the transference of communicable disease by means of the healer's own tools.

The prior art discloses many attempts at the solution of this problem by means generally similar to those of applicant but falling far short of the practical bounds dictated by the nature of the uses and necessities inherent in multiple-patient treatment. None of the prior art approaches have been adopted thus far because of the costs, cumbersomeness of the protective means, and time consumed in applying the protective cover to the thermometer. Heretofore clinical thermometers have been enclosed in various protective means such as glass cases and latex sleeves. The rate of heat transfer in the former is such that the delay engendered in getting a reading and changing the covers nullifies the advantage of being able to reuse the instrument without sterilization. Rubber and latex sheaths as shown in the prior art have a tendency to obscure the scale and are difficult to apply to the thermometer shaft and even more so to remove. Production of uniform products is also difficult and, as a consequence, expensive.

My invention remedies the defects in the prior art alluded to, by means of an innovation in the configuration of the sheath and an appreciation of the practical questions involved. In conventional practice only about one half of the thermometer shaft is exposed to possible contamination by the patient. It is this portion which could cause infection in a subsequent using. The protective cover of my invention is effective to accomplish the above purposes and excels the prior art in the ease of application to the thermometer and later removal therefrom. It is easy to read the scale of the thermometer through it. Related to this feature is the effectiveness of my invention in preventing the obscuring of the scale through being smeared with lipstick during the temperature taking. Such smears are difficult to remove and form a situs for infection. It is effective protection against breakage. It is capable of being sterilized. It has the advantages of prior art covers but overcomes their disadvantages.

An object of my invention is to produce a sheath or cover for a thermometer which prevents transfer of disease-causing microorganisms from a surface, normally in contact with the instrument as used, to the instrument itself. This in turn prevents infection of subsequent areas contacted by the thermometer in the same patient or in other patients.

Another object of my invention is to produce a prophylactic thermometer cover which is expendable.

A further object is to produce a protective cover which is both easy to apply to said thermometer and also easy to remove upon the completion of the taking of the patient's temperature.

A still further object is to produce a cover which is substantially transparent, so that the scale of the thermometer can be easily read therethrough.

Another object of my invention is the production of a tough pliable sheath which will protect the person whose temperature is being taken from the injury and discomfort attending the breakage of a thermometer.

Other objects, advantages and improvements of my invention will become apparent from the following description read in conjunction with the accompanying drawings in which similar elements are designated by like numerals:

Figures 1, 2:
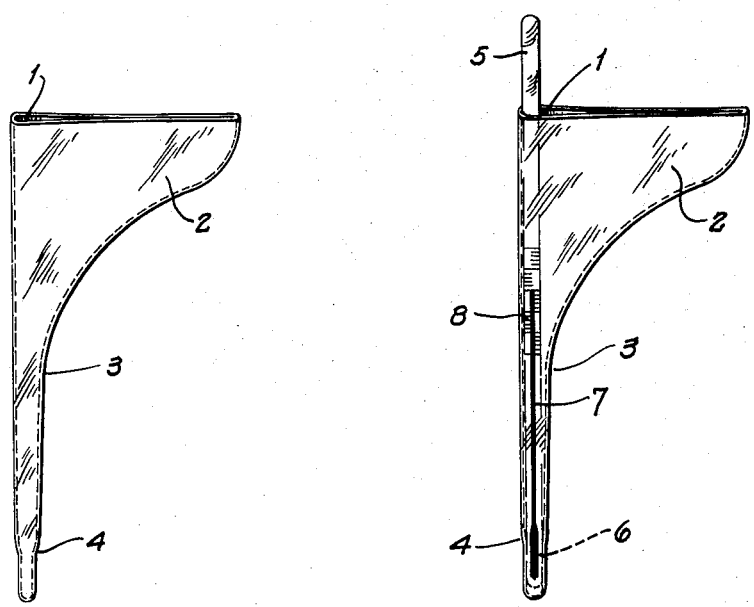
Fig. 1 shows the sheath ready for use.
Fig. 2 shows the sheath as it is when applied to the thermometer.

My invention comprises the formation of a sheath of transparent, resilient material having novel dimensions critical to the proper accomplishment of the objects previously stated. Polyethylene of a desirable thickness, .00025" to .0075", has proven satisfactory, since it is easily made aseptic by conventional methods such as autoclaving. It must be remembered that as the thickness of the sheath increases, the rate of heat transfer decreases. The fact that these sheaths are contemplated as being expendable puts little premium on long range durability. The thinner is the material used, the better is the heat transfer obtained, the greater is the ease of reading the thermometer scale, and the more readily is the sheath removed upon completion of use. It also makes for ease of fabrication of the sheath itself.

In Fig. 1 mouth 1 is shown, which wide opening does away with the usual threading operation involved in inserting a shaft into a sleeve of only slightly greater inner dimension than its outer dimension. The mouth 1 by its manner of formation on one side of the eventual major axis of the thermometer results in the upper portion of the sheath forming a flap 2 which provides a gripping area, the use of which insures freedom of contamination of the inserted end from the fingers of the operator. The bulb of the thermometer itself is also free from contamination. Flap 2 is terminated in its lower extremity well above the point 3 on the sheath which marks the extreme depth to which it is inserted in a patient. The end of the sheath receiving the bulb is tapered or constricted so it is somewhat smaller than the bulb itself. Insertion of the bulb distends the sheath forming a tight air-free seal of sheath to glass, necessary for adequate heat transfer.

In Fig. 2 thermometer 5 is shown inserted in the sheath. The bulb 6 has distended the compliant elastomeric material of the sheath so it covers the bulb 6 tightly, free from any air spaces which would impair the efficient functioning of the thermometer by blocking the transfer of heat from the body being measured to the heat-expansible liquid 7. Thermometer 5 is placed in the sheath in such a manner that scale 8 can be read through the transparent wall of the sheath. It can be faced any way so that its scaled surface is directly opposed by that of the enveloping sheath.

My invention eliminates reliance on the use of antiseptics and bactericides whose potency in use is hard to readily determine and whose residual on the instrument causes irritation of individual patients in varying degrees. It is expendable. The cheapness of material and ease of manufacture do not indicate the existence of any economic barrier to the use of this product. It is cheap, simple and certain in its use.

Variations may be made in the invention as set forth herein without departing from the spirit and the scope thereof.

Having thus set forth my invention, I claim:

A protective disposable sheath for housing a clinical thermometer in use consisting of a thin, transparent, plastic sheath having an open upper end and a closed bottom end, an elongated portion terminating in the closed end and being throughout a major part of its length of substantially the same diameter as that of the thermometer it is adapted to receive so as to fit snugly the barrel of the thermometer, one side of said elongated portion being straight and parallel to the axis of the thermometer when housed therein, said straight side extending the full length of the sheath from the bottom end to the upper end, the upper end of the sheath being of a much greater width than the lower restricted portion forming a tab portion having the opposed faces thereof normally in face to face engagement with one another, the upper end of the tab portion being open, with the open end thereof extending substantially at right angles to said straight side, the open upper end of said tab portion having a wide mouth for easy insertion and withdrawal of the thermometer, and also forming a flexible flap by which the sheath may be held at a locus remote from the thermometer.

References Cited in the file of this patent

UNITED STATES PATENTS

| | | |
|---|---|---|
| 2,100,613 | Rowntree | Nov. 30, 1937 |
| 2,102,653 | Smith | Dec. 21, 1937 |
| 2,768,736 | Govoni | Oct. 30, 1956 |

FOREIGN PATENTS

| | | |
|---|---|---|
| 169,666 | Great Britain | Oct. 6, 1921 |